(12) United States Patent
Li et al.

(10) Patent No.: US 12,023,846 B2
(45) Date of Patent: Jul. 2, 2024

(54) METHOD OF FORMING A DENTAL APPLIANCE

(71) Applicant: Align Technology, Inc., San Jose, CA (US)

(72) Inventors: Chunhua Li, Cupertino, CA (US); Yan Chen, Cupertino, CA (US)

(73) Assignee: Align Technology, Inc., San Jose, CA (US)

( * ) Notice: Subject to any disclaimer, the term of this patent is extended or adjusted under 35 U.S.C. 154(b) by 159 days.

(21) Appl. No.: 17/175,554

(22) Filed: Feb. 12, 2021

(65) Prior Publication Data
US 2021/0178654 A1 Jun. 17, 2021

Related U.S. Application Data

(63) Continuation of application No. 15/990,383, filed on May 25, 2018, now Pat. No. 10,919,209, which is a
(Continued)

(51) Int. Cl.
| | |
|---|---|
| *B29C 51/02* | (2006.01) |
| *A61C 7/08* | (2006.01) |
| *B29B 11/14* | (2006.01) |
| *B29B 13/02* | (2006.01) |
| *B29C 35/02* | (2006.01) |
| *B29C 39/00* | (2006.01) |
| *B29C 39/02* | (2006.01) |

(Continued)

(52) U.S. Cl.
CPC ............. *B29C 51/02* (2013.01); *A61C 7/08* (2013.01); *B29B 11/14* (2013.01); *B29B 13/023* (2013.01); *B29C 35/02* (2013.01); *B29C 39/006* (2013.01); *B29C 39/026* (2013.01); *B29C 45/0001* (2013.01); *B29C 51/002* (2013.01); *B29K 2075/00* (2013.01); *B29K 2101/10* (2013.01); *B29L 2031/753* (2013.01); *B29L 2031/7532* (2013.01)

(58) Field of Classification Search
None
See application file for complete search history.

(56) References Cited

U.S. PATENT DOCUMENTS

| | | | | |
|---|---|---|---|---|
| 5,324,186 | A | * | 6/1994 | Bakanowski ........... B29C 35/08 425/DIG. 11 |
| 5,403,188 | A | * | 4/1995 | Oxman .................. A61K 6/887 522/90 |

(Continued)

*Primary Examiner* — Benjamin A Schiffman
(74) *Attorney, Agent, or Firm* — Shay Glenn LLP

(57) ABSTRACT

Methods of forming dental appliances. The methods may include partially curing a prepolymer mixture in a first mold to form a partially cured polymer mixture. The first mold may have an internal cavity that is shaped to provide the partially cured polymer mixture with a first shape having a channel in accordance with a dental arch. The first shape may have a greater thickness at locations corresponding to where a gingival line of the dental appliance will be formed compared to a thickness at occlusal surfaces of the dental appliance. The methods may include modifying the first shape of the partially cured polymer mixture to form a shell having cavities shaped to receive teeth. The methods may also include fully curing the shell by exposing the partially cured polymer mixture to energy until the partially cured polymer mixture thermosets.

21 Claims, 10 Drawing Sheets

Related U.S. Application Data continuation of application No. 14/318,283, filed on Jun. 27, 2014, now abandoned, which is a continuation of application No. 12/583,062, filed on Aug. 13, 2009, now Pat. No. 8,765,031.

(51) Int. Cl.
  *B29C 45/00* (2006.01)
  *B29C 51/00* (2006.01)
  *B29K 75/00* (2006.01)
  *B29K 101/10* (2006.01)
  *B29L 31/00* (2006.01)

(56) References Cited

U.S. PATENT DOCUMENTS

| | | | |
|---|---|---|---|
| 5,449,703 A * | 9/1995 | Mitra | A61K 6/887 |
| | | | 264/16 |
| 5,820,368 A | 10/1998 | Wolk | |
| 5,975,893 A | 11/1999 | Chishti et al. | |
| 6,183,248 B1 | 2/2001 | Chishti et al. | |
| 6,210,162 B1 | 4/2001 | Chishti et al. | |
| 6,309,215 B1 | 10/2001 | Phan et al. | |
| 6,386,864 B1 | 5/2002 | Kuo | |
| 6,390,812 B1 * | 5/2002 | Chishti | A61C 7/00 |
| | | | 433/24 |
| 6,441,354 B1 * | 8/2002 | Seghatol | A61C 5/00 |
| | | | 219/709 |
| 6,454,565 B2 * | 9/2002 | Phan | B29C 48/154 |
| | | | 433/6 |
| 6,471,511 B1 | 10/2002 | Chishti et al. | |
| 6,497,574 B1 | 12/2002 | Miller | |
| 6,524,101 B1 | 2/2003 | Phan et al. | |
| 6,572,372 B1 | 6/2003 | Phan et al. | |
| 6,607,382 B1 | 8/2003 | Kuo et al. | |
| 6,705,863 B2 | 3/2004 | Phan et al. | |
| 6,783,604 B2 | 8/2004 | Tricca | |
| 6,790,035 B2 | 9/2004 | Tricca et al. | |
| 6,814,574 B2 | 11/2004 | Abolfathi et al. | |
| 6,830,450 B2 | 12/2004 | Knopp et al. | |
| 6,947,038 B1 | 9/2005 | Anh et al. | |
| 6,957,118 B2 | 10/2005 | Kopelman et al. | |
| 6,976,627 B1 | 12/2005 | Culp et al. | |
| 7,074,039 B2 | 7/2006 | Kopelman et al. | |
| 7,092,784 B1 | 8/2006 | Simkins | |
| 7,104,792 B2 | 9/2006 | Taub et al. | |
| 7,121,825 B2 | 10/2006 | Chishti et al. | |
| 7,160,107 B2 | 1/2007 | Kopelman et al. | |
| 7,192,273 B2 | 3/2007 | McSurdy, Jr. | |
| 7,220,124 B2 | 5/2007 | Taub et al. | |
| 7,236,842 B2 | 6/2007 | Kopelman et al. | |
| 7,245,977 B1 | 7/2007 | Simkins | |
| 7,261,533 B2 | 8/2007 | Wrosz et al. | |
| 7,335,024 B2 | 2/2008 | Wen | |
| 7,347,688 B2 | 3/2008 | Kopelman et al. | |
| 7,354,270 B2 | 4/2008 | Abolfathi et al. | |
| 7,384,266 B2 | 6/2008 | Wen | |
| 7,435,084 B2 | 10/2008 | Liu et al. | |
| 7,448,514 B2 | 11/2008 | Wen | |
| 7,472,789 B2 | 1/2009 | Wu et al. | |
| 7,476,100 B2 | 1/2009 | Kuo | |
| 7,481,121 B1 | 1/2009 | Cao | |
| 7,481,647 B2 | 1/2009 | Sambu et al. | |
| 7,543,511 B2 | 6/2009 | Kimura et al. | |
| 7,553,157 B2 | 6/2009 | Abolfathi et al. | |
| 7,600,999 B2 | 10/2009 | Knopp | |
| 7,604,181 B2 | 10/2009 | Culp et al. | |
| 7,641,828 B2 | 1/2010 | DeSimone et al. | |
| 7,648,360 B2 | 1/2010 | Kuo | |
| 7,658,610 B2 | 2/2010 | Knopp | |
| 7,674,422 B2 | 3/2010 | Kuo | |
| 7,711,447 B2 | 5/2010 | Lu et al. | |
| 7,748,199 B2 | 7/2010 | Sankaran et al. | |
| 7,766,658 B2 | 8/2010 | Tricca et al. | |
| 7,771,195 B2 | 8/2010 | Knopp et al. | |
| 7,802,987 B1 | 9/2010 | Phan | |
| 7,819,659 B2 | 10/2010 | Wen | |
| 7,831,322 B2 | 11/2010 | Liu et al. | |
| 7,840,373 B2 | 11/2010 | Culp et al. | |
| 7,854,609 B2 | 12/2010 | Chen et al. | |
| 7,871,269 B2 | 1/2011 | Wu et al. | |
| 7,878,801 B2 | 2/2011 | Abolfathi et al. | |
| 7,878,805 B2 | 2/2011 | Moss et al. | |
| 7,883,334 B2 | 2/2011 | Li et al. | |
| 7,914,283 B2 | 3/2011 | Kuo | |
| 7,922,490 B2 | 4/2011 | Wen | |
| 7,947,508 B2 | 5/2011 | Tricca et al. | |
| 7,957,824 B2 | 6/2011 | Boronvinskih et al. | |
| 7,985,414 B2 * | 7/2011 | Knaack | A61K 31/785 |
| | | | 424/422 |
| 8,019,465 B2 | 9/2011 | Spiridonov et al. | |
| 8,030,588 B2 | 10/2011 | Culp et al. | |
| 8,087,932 B2 | 1/2012 | Liu | |
| 8,152,518 B2 | 4/2012 | Kuo | |
| 8,172,569 B2 | 5/2012 | Matty et al. | |
| 8,235,715 B2 | 8/2012 | Kuo | |
| 8,292,617 B2 | 10/2012 | Brandt et al. | |
| 8,337,199 B2 | 12/2012 | Wen | |
| 8,401,686 B2 | 3/2013 | Moss et al. | |
| 8,517,726 B2 | 8/2013 | Kakavand et al. | |
| 8,562,337 B2 | 10/2013 | Kuo et al. | |
| 8,636,513 B2 | 1/2014 | Wen | |
| 8,641,414 B2 | 2/2014 | Borovinskih et al. | |
| 8,684,729 B2 | 4/2014 | Wen | |
| 8,708,697 B2 | 4/2014 | Li et al. | |
| 8,758,009 B2 | 6/2014 | Chen et al. | |
| 8,771,149 B2 | 7/2014 | Rahman et al. | |
| 8,776,391 B1 | 7/2014 | Kaza et al. | |
| 8,899,976 B2 | 12/2014 | Chen et al. | |
| 8,899,977 B2 | 12/2014 | Cao et al. | |
| 8,936,463 B2 | 1/2015 | Mason et al. | |
| 8,936,464 B2 | 1/2015 | Kopelman | |
| 9,022,781 B2 | 5/2015 | Kuo et al. | |
| 9,108,338 B2 | 8/2015 | Sirovskiy et al. | |
| 9,119,691 B2 | 9/2015 | Namiranian et al. | |
| 9,161,823 B2 | 10/2015 | Morton et al. | |
| 9,241,774 B2 | 1/2016 | Li et al. | |
| 9,326,831 B2 | 5/2016 | Cheang | |
| 9,403,238 B2 | 8/2016 | Culp | |
| 9,433,476 B2 | 9/2016 | Khardekar et al. | |
| 9,610,141 B2 | 4/2017 | Kopelman et al. | |
| 9,655,691 B2 | 5/2017 | Li et al. | |
| 9,675,427 B2 | 6/2017 | Kopelman | |
| 9,700,385 B2 | 7/2017 | Webber | |
| 9,744,001 B2 | 8/2017 | Choi et al. | |
| 9,844,424 B2 | 12/2017 | Wu et al. | |
| 9,943,386 B2 | 4/2018 | Webber et al. | |
| 9,943,991 B2 | 4/2018 | Tanugula et al. | |
| 10,045,835 B2 | 8/2018 | Boronkay et al. | |
| 10,111,730 B2 | 10/2018 | Webber et al. | |
| 10,150,244 B2 | 12/2018 | Sato et al. | |
| 10,201,409 B2 | 2/2019 | Mason et al. | |
| 10,213,277 B2 | 2/2019 | Webber et al. | |
| 10,299,894 B2 | 5/2019 | Tanugula et al. | |
| 10,336,102 B2 | 7/2019 | Cole | |
| 10,363,116 B2 | 7/2019 | Boronkay | |
| 10,383,705 B2 | 8/2019 | Shanjani et al. | |
| D865,180 S | 10/2019 | Bauer et al. | |
| 10,449,016 B2 | 10/2019 | Kimura et al. | |
| 10,463,452 B2 | 11/2019 | Matov et al. | |
| 10,470,847 B2 | 11/2019 | Shanjani et al. | |
| 10,492,888 B2 | 12/2019 | Chen et al. | |
| 10,495,973 B2 | 12/2019 | Cole | |
| 10,517,701 B2 | 12/2019 | Boronkay | |
| 10,537,406 B2 | 1/2020 | Wu et al. | |
| 10,537,463 B2 | 1/2020 | Kopelman | |
| 10,548,700 B2 | 2/2020 | Fernie | |
| 10,555,792 B2 | 2/2020 | Kopelman et al. | |
| 10,588,776 B2 | 3/2020 | Cam et al. | |
| 10,613,515 B2 | 4/2020 | Cramer et al. | |
| 10,639,134 B2 | 5/2020 | Shanjani et al. | |
| 10,743,964 B2 | 8/2020 | Wu et al. | |
| 10,758,323 B2 | 9/2020 | Kopelman | |
| 10,781,274 B2 | 9/2020 | Liska et al. | |

(56) References Cited

U.S. PATENT DOCUMENTS

| | | |
|---|---|---|
| 10,783,629 B2 | 9/2020 | Parpara et al. |
| 10,813,720 B2 | 10/2020 | Grove et al. |
| 10,874,483 B2 | 12/2020 | Boronkay |
| 10,881,487 B2 | 1/2021 | Cam et al. |
| 10,888,395 B2 | 1/2021 | Kopelman |
| 10,912,629 B2 | 2/2021 | Tanugula et al. |
| 10,959,810 B2 | 3/2021 | Li et al. |
| 10,993,783 B2 | 5/2021 | Wu et al. |
| 11,026,768 B2 | 6/2021 | Moss et al. |
| 11,026,831 B2 | 6/2021 | Kuo |
| 11,045,282 B2 | 6/2021 | Kopelman et al. |
| 11,045,283 B2 | 6/2021 | Riley et al. |
| 11,103,330 B2 | 8/2021 | Webber et al. |
| 11,123,156 B2 | 9/2021 | Cam et al. |
| 2002/0192617 A1 | 12/2002 | Phan et al. |
| 2004/0166462 A1 | 8/2004 | Phan et al. |
| 2004/0166463 A1 | 8/2004 | Wen et al. |
| 2004/0243361 A1 | 12/2004 | Steuben et al. |
| 2005/0014105 A1 | 1/2005 | Abolfathi et al. |
| 2005/0147944 A1* | 7/2005 | Karim ............... A61C 13/0022 264/16 |
| 2005/0186524 A1 | 8/2005 | Abolfathi et al. |
| 2005/0244768 A1 | 11/2005 | Taub et al. |
| 2006/0019218 A1 | 1/2006 | Kuo |
| 2006/0078841 A1 | 4/2006 | Desimone et al. |
| 2006/0093982 A1 | 5/2006 | Wen |
| 2006/0093987 A1 | 5/2006 | Wen |
| 2006/0093993 A1 | 5/2006 | Wen |
| 2006/0115782 A1 | 6/2006 | Li et al. |
| 2006/0115785 A1 | 6/2006 | Li et al. |
| 2006/0127850 A1 | 6/2006 | Wen |
| 2006/0127857 A1 | 6/2006 | Zhenhuan et al. |
| 2006/0127858 A1 | 6/2006 | Wen |
| 2006/0127859 A1 | 6/2006 | Wen |
| 2006/0127860 A1 | 6/2006 | Wen |
| 2006/0172250 A1 | 8/2006 | Wen |
| 2006/0199142 A1 | 9/2006 | Liu et al. |
| 2006/0199145 A1 | 9/2006 | Liu et al. |
| 2006/0234179 A1 | 10/2006 | Wen et al. |
| 2007/0092853 A1 | 4/2007 | Liu et al. |
| 2007/0122592 A1* | 5/2007 | Anderson ............... A61C 7/08 264/16 |
| 2007/0243502 A1 | 10/2007 | Wen |
| 2008/0083348 A1 | 4/2008 | Kuo et al. |
| 2008/0118882 A1 | 5/2008 | Su |
| 2008/0160473 A1 | 7/2008 | Li et al. |
| 2008/0286716 A1 | 11/2008 | Sherwood |
| 2008/0286717 A1 | 11/2008 | Sherwood |
| 2009/0148814 A1 | 6/2009 | Li et al. |
| 2009/0280450 A1 | 11/2009 | Kuo |
| 2010/0055635 A1 | 3/2010 | Kakavand |
| 2010/0068676 A1 | 3/2010 | Mason et al. |
| 2010/0129763 A1 | 5/2010 | Kuo |
| 2011/0269092 A1 | 11/2011 | Kuo et al. |
| 2014/0067334 A1 | 3/2014 | Kuo |
| 2015/0265376 A1 | 9/2015 | Kopelman |
| 2015/0366637 A1 | 12/2015 | Kopelman et al. |
| 2015/0366638 A1 | 12/2015 | Kopelman et al. |
| 2016/0193014 A1 | 7/2016 | Morton et al. |
| 2016/0242870 A1 | 8/2016 | Matov et al. |
| 2016/0242871 A1 | 8/2016 | Morton et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007366 A1 | 1/2017 | Kopelman et al. |
| 2017/0007386 A1 | 1/2017 | Mason et al. |
| 2017/0135792 A1 | 5/2017 | Webber |
| 2017/0135793 A1 | 5/2017 | Webber et al. |
| 2017/0165032 A1 | 6/2017 | Webber et al. |
| 2018/0153648 A1 | 6/2018 | Shanjani et al. |
| 2018/0168776 A1 | 6/2018 | Webber |
| 2018/0360567 A1 | 12/2018 | Xue et al. |
| 2018/0368944 A1 | 12/2018 | Sato et al. |
| 2019/0000592 A1 | 1/2019 | Cam et al. |
| 2019/0000593 A1 | 1/2019 | Cam et al. |
| 2019/0021817 A1 | 1/2019 | Sato et al. |
| 2019/0029775 A1 | 1/2019 | Morton et al. |
| 2019/0046297 A1 | 2/2019 | Kopelman et al. |
| 2019/0099129 A1 | 4/2019 | Kopelman et al. |
| 2019/0125494 A1 | 5/2019 | Li et al. |
| 2019/0125497 A1 | 5/2019 | Derakhshan et al. |
| 2019/0152152 A1 | 5/2019 | O'Leary et al. |
| 2019/0175304 A1 | 6/2019 | Morton et al. |
| 2019/0231477 A1 | 8/2019 | Shanjani et al. |
| 2019/0262101 A1 | 8/2019 | Shanjani et al. |
| 2019/0298494 A1 | 10/2019 | Webber et al. |
| 2019/0314119 A1 | 10/2019 | Kopelman et al. |
| 2019/0338067 A1 | 11/2019 | Liska et al. |
| 2019/0343606 A1 | 11/2019 | Wu et al. |
| 2020/0000553 A1 | 1/2020 | Makarenkova et al. |
| 2020/0078137 A1 | 3/2020 | Chen et al. |
| 2020/0086553 A1 | 3/2020 | Mojdeh et al. |
| 2020/0100864 A1 | 4/2020 | Wang et al. |
| 2020/0100865 A1 | 4/2020 | Wang et al. |
| 2020/0100866 A1 | 4/2020 | Medvinskaya et al. |
| 2020/0100871 A1 | 4/2020 | Wang et al. |
| 2020/0130237 A1 | 4/2020 | Mojdeh et al. |
| 2020/0155276 A1 | 5/2020 | Cam et al. |
| 2020/0160497 A1 | 5/2020 | Shah et al. |
| 2020/0188062 A1 | 6/2020 | Kopelman et al. |
| 2020/0214598 A1 | 7/2020 | Li et al. |
| 2020/0214801 A1 | 7/2020 | Wang et al. |
| 2020/0290262 A1 | 9/2020 | Aguilar Mendez et al. |
| 2020/0306017 A1 | 10/2020 | Chavez et al. |
| 2020/0311934 A1 | 10/2020 | Cherkas et al. |
| 2020/0316856 A1 | 10/2020 | Mojdeh et al. |
| 2020/0390523 A1 | 12/2020 | Sato et al. |
| 2021/0030516 A1 | 2/2021 | O'Leary et al. |
| 2021/0078357 A1 | 3/2021 | Venkatasanthanam et al. |
| 2021/0147672 A1 | 5/2021 | Cole et al. |

\* cited by examiner

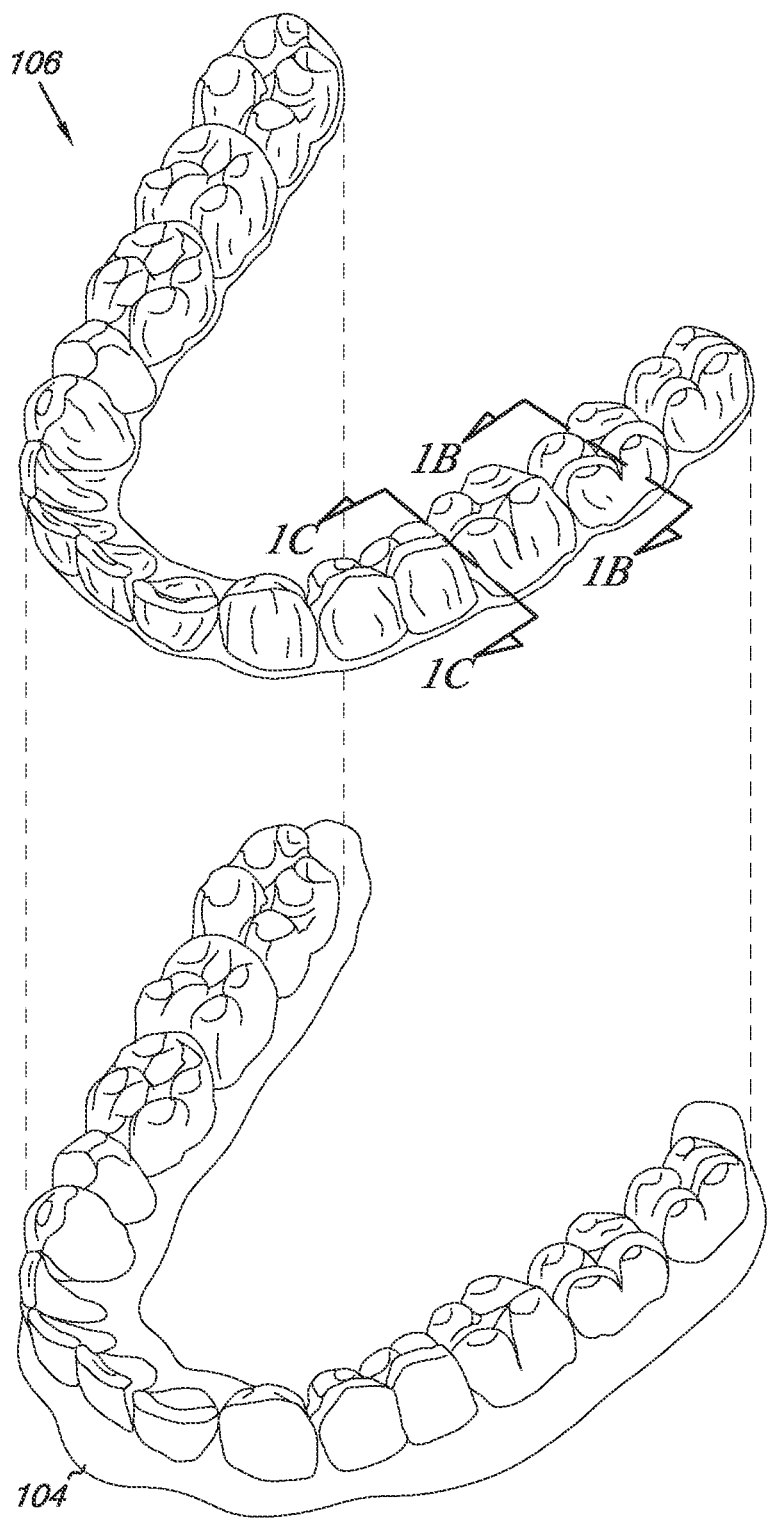
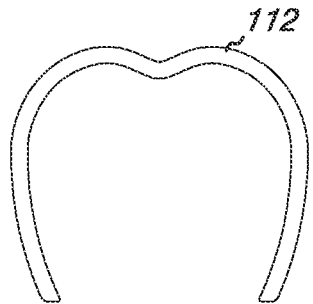
Fig. 1B
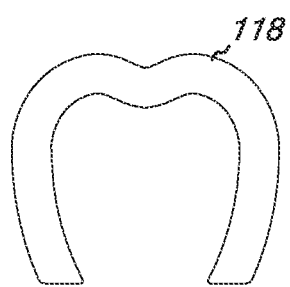
Fig. 1C
Fig. 1A

METHOD OF FORMING A DENTAL APPLIANCE

CROSS REFERENCE TO RELATED APPLICATIONS

This application is a continuation of U.S. patent application Ser. No. 15/990,383, filed on May 25, 2018, which is a continuation of U.S. patent application Ser. No. 14/318,283, filed on Jun. 27, 2014, now abandoned, which is a continuation of U.S. patent application Ser. No. 12/583,062, filed on Aug. 13, 2009, now U.S. Pat. No. 8,765,031, the entire contents of which are hereby incorporated by reference.

INCORPORATION BY REFERENCE

All publications and patent applications mentioned in this specification are incorporated herein by reference in their entirety to the same extent as if each individual publication or patent application was specifically and individually indicated to be incorporated by reference.

BACKGROUND

The present disclosure is related generally to the field of dental treatment. More particularly, the present disclosure is related to the fabrication of polymeric dental appliances for orthodontic dental treatment.

Many dental treatments involve repositioning misaligned teeth and changing bite configurations for improved cosmetic appearance and dental function. Repositioning can be accomplished, for example, by applying controlled forces to one or more teeth over a period of time. Repositioning teeth for aesthetic or other reasons has been accomplished by wearing what are commonly referred to as "braces." Braces typically encompass a variety of hardware such as brackets, archwires, ligatures, and O-rings.

Some dental processes use polymeric dental positioning appliances, rather than braces, for realigning teeth. Such appliances may, for example, utilize a thin shell of material having resilient properties, referred to as an "aligner" that generally conforms to a patient's teeth but is slightly out of alignment with the present (e.g., initial) tooth configuration. Placement of such an appliance over the teeth provides controlled forces in specific locations to gradually move the teeth into a new configuration. Repetition of this process with successive appliances that provide progressive configurations eventually move the teeth through a series of intermediate arrangements to a final desired arrangement.

Many processes for forming such dental appliances utilize thermoplastic material. These materials have a long period in which the forming of the dental appliance can take place, and therefore are desirable materials.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1A illustrates a jaw including patient's teeth and an embodiment of a dental appliance to treat a dental condition of the patient according to the present disclosure.

FIG. 1B illustrates a dental appliance cross section as taken along line 1B-1B of FIG. 1A.

FIG. 1C illustrates a dental appliance cross section as taken along line 1C-1C of FIG. 1A.

DETAILED DESCRIPTION

Figure 2A:
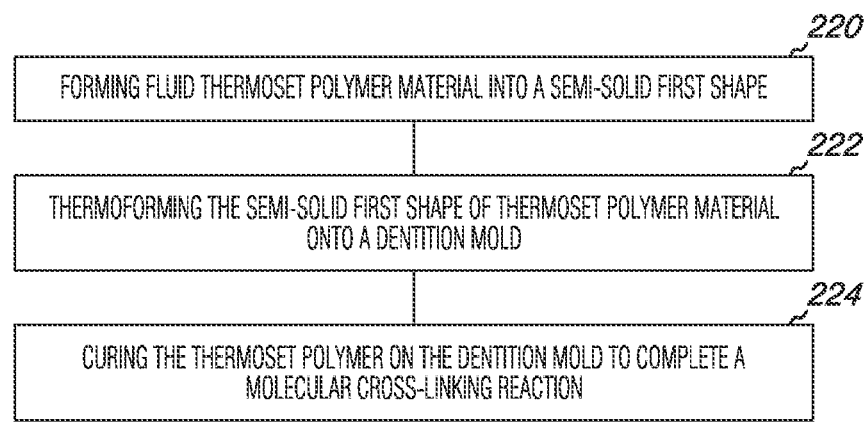
FIG. 2A is a block diagram illustrating a method for fabricating a dental appliance according to an embodiment of the present disclosure.

Embodiments of the present disclosure provide dental appliances and methods of making and using such appliances. In various embodiments, for example, a method embodiment for forming a dental appliance is described that includes partially curing a thermoset polymer material into a formable first shape. This method embodiment further includes thermoforming the first shape of thermoset polymer material onto a dentition mold, and fully curing the thermoset polymer on the dentition mold to complete a molecular cross-linking reaction.

In various embodiments, a dentition of the patient's teeth can be formed in a number of ways. For example, an impression of the patient's teeth can be taken to form the dentition.

In some instances, one or more digital models can be created and used to form the dentition. For example, the patient's teeth or the dentition created from the patient's teeth can be digitally scanned and the data manipulated to form dentitions used for repositioning teeth or for application of materials (e.g., chemical treatments) to the patient's teeth.

For instance, a digital model can be used to fabricate a dental appliance corresponding to a present, anticipated, and/or desired configuration of the patient's dentition through analysis and/or manipulation of the data set forming the digital model. Additional detail on the use of digital modeling can be found in commonly assigned U.S. patent application Ser. No. 12/283,770, filed on Sep. 16, 2008, entitled "Dental Condition Evaluation and Treatment."

A series of dental appliances, e.g., "aligners," generally rely on designing and fabricating some, most, or all of the appliances, to be worn by the patient over time, at the outset of treatment, or while treatment is occurring. In some processes, the design of the appliances uses computer modeling of a series of successive tooth arrangements and the individual appliances are designed to be worn over the teeth and to reposition the teeth by using the appliances in a serial order, progressing from a first appliance, through each of the intermediate appliances, to the last appliance. An example of a dental treatment system, including a series of dental appliances, e.g., "aligners," is described in commonly-assigned U.S. Pat. No. 5,975,893, which is incorporated herein in its entirety.

Dental aligners have been made of thermoplastic polymers, since this category of polymer can be easily thermoformed into a desired aligner configuration. For example, a sheet of thermoplastic polymer material can be heated over a mold in order to conform the thermoplastic polymer material to the shape of the mold. The mold may be of an existing configuration of a patient's teeth, or of an intended future configuration.

However, in some implementations, thermoplastic polymer materials tend to fatigue over time, particularly under constant loading, such as in orthodontic treatment applications. Thermoplastic polymer materials may also tend to deform over time due to stress relaxation of material, and/or material fatigue in some instances.

In some applications, aligner deformation can reduce force delivered to the teeth for some orthodontic movements, and thus, can provide inconsistent application of force throughout a particular course of treatment with a given aligner. In such applications, the fatigue and/or deformation limitations associated with thermoplastic polymer materials may limit the magnitude of movement that can be obtained from a particular aligner, or the time over which a particular aligner may be utilized.

In the embodiments described in the present disclosure, aligners can be molded using a thermoset polymer material. As used herein, a thermoset polymer material includes those polymeric materials that once shaped by applied energy (e.g., heat, pressure, radiation), or chemical reaction, so as to form a cross-linked polymeric matrix, are incapable of being reprocessed into a different form by further application of the particular energy.

That is, aligners can be molded using a category of polymers that are irreversibly cured in the desired aligner configuration. Examples of thermoset polymer materials include castable/casting polyurethane, acrylate curable polymers, silicone thermoset polymers and elastomers, and epoxy polymers, among others.

An aligner is formed to a patient's teeth, or to programmed dentitions (e.g., intermediate teeth configurations of a proposed orthodontic treatment plan). An aligner formed using thermoset polymer materials is capable of capturing the details of a particular dentition, either by intermediate thermoforming over the dentition, or by another suitable process. Several examples of methods for forming a dental appliance (e.g., an aligner) using thermoset polymer materials are provided below.

FIG. 1A illustrates a jaw including patient's teeth and an embodiment of a dental appliance to treat a dental condition of the patient according to the present disclosure. The devices, methods, or systems of the present disclosure can be, or employ, any manner of positioners, trays, retainers, and/or other removable dental appliances. The systems for use in various embodiments of the present disclosure can utilize a single appliance, or a plurality of such appliances that can, for example, be worn by a patient successively in order to achieve the gradual tooth repositioning, as described herein.

Accordingly, embodiments of the present disclosure are not limited to an "aligner" that is intentionally fabricated slightly out of alignment with the present tooth configuration so as to provide force to one or more teeth. As will be appreciated, a dental appliance according to embodiments of the present disclosure may conform to a patient's tooth configuration. Thus, according to at least one embodiment of the present disclosure, treatment targeted at a particular tooth, several teeth, and/or the gingiva can be accomplished concurrent with alignment treatment (e.g., tooth position adjustment), or separate and distinct from the alignment treatment.

The present disclosure also includes one or more method embodiments for forming (e.g., casting) a dental appliance. For example, one such method embodiment includes delivering a fluid (e.g., liquid, viscous mass) thermoset polymer precursor to a first mold having an internal cavity.

The internal cavity has a surface corresponding to an external surface of the dental appliance. The method further includes placing a second mold in proximity to the first mold such that a volume for the thermoset polymer precursor remains therebetween, the second mold being a positive dentition mold having an external surface corresponding to an internal surface of the dental appliance, and curing the thermoset polymer precursor with energy to complete a molecular cross-linking reaction, e.g., cause molecules of the thermoset polymer precursor to irreversibly link into a rigid three dimensional structure.

In various apparatus embodiments, a tooth position adjustment dental appliance is produced according to a method set forth above, the dental appliance having cavities shaped to receive and resiliently reposition teeth from a first arrangement to a second arrangement. For example, a dental appliance can include a shell having a number of cavities to receive one or more teeth formed of cross-linked polymer materials. In some embodiments, the shell is formed of thermoset polymer materials.

In one or more apparatus embodiments, the dental appliance is an aligner (e.g., shell) having a number of cavities to receive one or more teeth. The aligner is one of a series of aligners corresponding to intermediate steps of an orthodontic treatment where the number of cavities are arranged to reposition the one or more teeth from a first configuration to a successive configuration, and the aligner is fabricated from material that is irreversibly cured to irreversibly link molecules into a rigid three dimensional structure.

A dental appliance 106 (e.g., a dental positioning appliance such as an aligner, a tray for delivery of chemicals in proximity to the teeth or gums, etc.) can include a number of cavities for receiving one or more corresponding teeth. In various embodiments, the cavities can correspond to one, or multiple, teeth, implants, and/or other features of a patient's jaw.

Embodiments of the present disclosure include dental appliances, such as aligners for orthodontic positioning of one or more teeth, formed from thermoset polymer materials. In contrast to thermoplastics, thermoset polymer materials tend to fatigue less over time when placed under constant loading, such as in orthodontic treatment applications. Thermoset polymer materials deform less over time due to stress relaxation of material, and material fatigue, thereby maintaining the force delivered to the teeth for orthodontic movements for a longer period, and providing more consistent application of force throughout a particular course of treatment.

Embodiments of the present disclosure are described in relation to the accompanying drawings, which will at least assist in illustrating the various features of the various embodiments. In the Figures, the first digit of a reference number refers to the Figure in which it is used, while the remaining two digits of the reference number refer to the same or equivalent parts of embodiment(s) of the present disclosure used throughout the several figures of the drawing. The scaling of the figures does not represent precise dimensions and/or dimensional ratios of the various elements illustrated herein.

The dental appliance 106 may be designed to fit over a number of, in many instances all teeth, present in an upper or lower jaw. Dental appliances can be configured to apply force to reposition one or more teeth from a first configuration of the teeth to a successive configuration of the teeth, used in application of medication or other beneficial materials in proximity to one or more teeth and/or the gums, or used to hold teeth in place, among other such uses.

In some embodiments, certain individual teeth, or small sets of the teeth, can be repositioned while one or more other the teeth provide a base or anchor region for holding the repositioning appliance in place as it applies a resilient repositioning force against the tooth or teeth to be repositioned. Some embodiments can have repositioning portions, anchor portions, and/or portions that cover a portion of a tooth or teeth but do not provide any force to the covered tooth or teeth.

In various embodiments, one or more cavities of the dental appliance are formed in an oversized manner with respect to the teeth over which it is to be applied (e.g., by scaling-up) for chemically treating one or more certain teeth. For example, one or more chemicals (e.g., medications) or other materials may be applied to the interior surface of the appliance due to the scaled up nature of this appliance's fabrication.

FIG. 1B illustrates a dental appliance cross section 112, as taken along line 1B-1B of FIG. 1A. FIG. 1C illustrates a dental appliance cross section 118, as taken along line 1C-1C of FIG. 1A. As illustrated, the dental appliance can have a U-shaped cross-section to form one or more cavities for placement of a patient's teeth therein. Such a shape can be formed, for example, by placement of a partially cured thermoset polymer material over a dentition mold (e.g., forming the inner surface).

Thermoset polymer material can be classified as uncured, partially cured, or cured (i.e., fully cured). Uncured thermoset polymer material describes unreacted resin (e.g., A-stage of cure). Fully cured thermoset polymer material describes thermoset polymer material having complete molecular cross-linking reaction, so as to irreversibly cross-link molecules into a rigid three dimensional structure (e.g., C-stage of cure). Partially cured thermoset polymer material describes thermoset polymer material between uncured and fully cured stages of cure (e.g., sometimes called the green phase or B-stage of cure).

FIG. 2A is a block diagram illustrating a method for fabricating a dental appliance according to an embodiment of the present disclosure. According to one or more embodiments, a method for forming a dental appliance includes forming and partially curing a liquid thermoset polymer material into a semi-solid first shape at 220. The method further includes thermoforming the semi-solid first shape of thermoset polymer material onto a dentition mold at 222, and curing the thermoset polymer on the dentition mold with energy, or chemical reaction, to complete a molecular cross-linking reaction at 224.

A wide range of processing techniques may be used for forming, or partially curing, the liquid thermoset polymer material into a semi-solid first shape, including molding, extrusion, rolling, etc. Some suitable processing techniques for producing the first shape include compression molding, such as is used to make precision parts; liquid injection molding, for example using low pressure in conjunction with a bottom fill mold; and reaction injection molding with high pressure impingement mixing. Other suitable processing techniques may also be used, including, but not limited to: open casting; centrifugal molding, including pipelining, making of sheet goods and use of multi-cavity molds; ribbon flow moldless casting where the first shape is formed using rollers rather than a mold; transfer molding, such as is used to make multiple precision parts; rotational molding, often used to make hollow items; vacuum casting, as may be used to make wire or fiber inserts; pressure casting utilizing a pressure chamber; B-staging used when the shape of particular molds create difficulty in holding liquids; spray; solvent casting involving low pressure for fabric penetration; and dipping for materials having a sufficiently long working life which may be heat activated; among others.

Figure 2B:
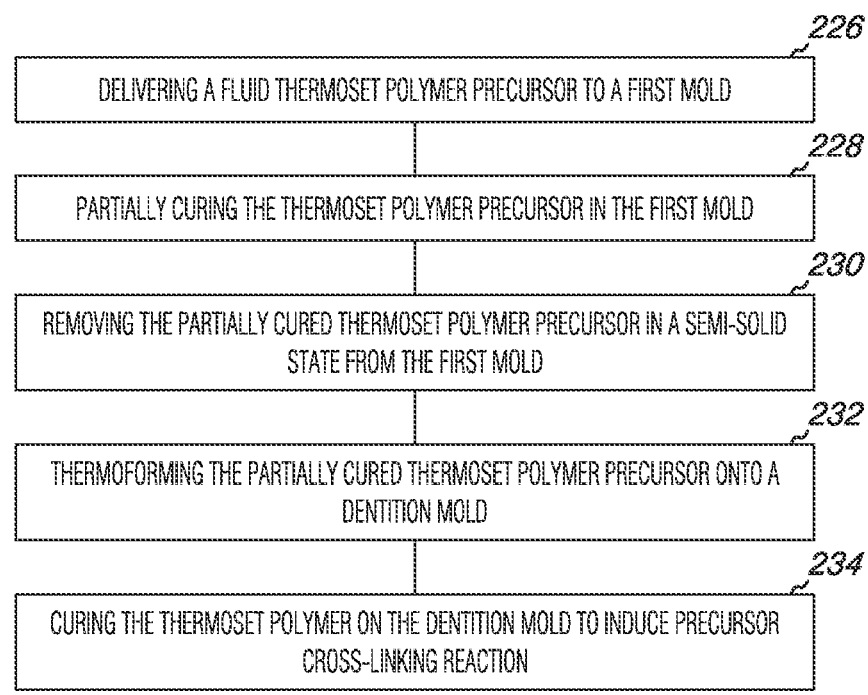
FIG. 2B is a block diagram illustrating another method embodiment for fabricating a dental appliance according to the present disclosure.

FIG. 2B is a block diagram illustrating another method embodiment for fabricating a dental appliance according to the present disclosure. According to one or more embodiments, a method for forming a dental appliance includes delivering a fluid thermoset polymer precursor to a first mold (e.g., to form a sheet or shell, for example) at 226, partially curing the thermoset polymer precursor in the first mold at 228, removing the partially cured thermoset polymer precursor in a semi-solid state from the first mold at 230, thermoforming the partially cured thermoset polymer precursor onto a dentition mold at 232, and curing the thermoset polymer precursor on the dentition mold with energy to induce a cross-linking reaction at 234.

One example of a method embodiment such as that described in FIG. 2B includes two or more urethane prepolymer components being prepared and mixed with one or more curatives to initiate a chemical reaction of the urethane prepolymer components. The thermoset polymer precursor is cast, or molded, into a preliminary configuration (e.g., sheet, shell), and partially cured.

As the thermoset polymer precursor begins to solidify into thermoset polymer material, but while the sheet is still not fully cured (e.g., a semi-solid state), it is often referred to as being in a "green" phase. The green phase sheets may be removed from the cast, or mold, and used to fabricate a dental appliance (e.g., an aligner) such as by thermoforming the green phase sheet onto a negative dentition mold of the intended configuration (e.g., 104 in FIG. 1A). Thereafter (e.g., after forming into an aligner configuration), the dental appliance can be further (e.g., fully) cured.

In some embodiments, the dental appliance is formed using green phase material that is further cured by exposure to a curative trigger. The curative trigger can be one or more of energy (e.g., light, heat, radiation), force (e.g., pressure), or chemical reaction. After forming (e.g., applied to a mold), the green phase material can be exposed to the curative trigger for some period of time to allow the formed dental appliance to substantially cure as a thermoset polymer material. However, embodiments of the present disclosure are not limited to exposing the green phase material to a curative trigger after forming in order to obtain substantial curing.

In some embodiments, a dental appliance may be formed after exposure of the green phase material to a curative trigger (e.g., at an appropriate time during curing as the thermoset polymer precursor transitions to being substantially cured as a thermoset polymer material). That is, curing may be initiated as a result of a chemical reaction, and at some window of time during the curing process, the partially cured materials are removed from a preliminary configuration mold, thermoformed onto a dentition, and allowed to continue curing thereon, without further exposure to a curative trigger (e.g., energy, force, chemical, or other trigger).

According to one or more embodiments, a method for forming a dental appliance does not include forming green phase stock used for further forming into a dental appliance. Rather, a dental appliance is fabricated directly from the thermoset polymer precursor materials.

For example, curable polymers can be mixed with the desired components and initiators. This thermoset polymer precursor can then be directly injected into a positive dentition mold, and allowed to partially cure in the mold.

In this manner, a partially cured dental appliance can be formed directly. This partially cured dental appliance aligner can be further cured (e.g., fully), in the mold or after removal from the mold, by application of energy such as radiation, light, heat, pressure, or some combination thereof, to complete the cross-linking reaction. Again, further curing is not limited by input of additional energy, and can also occur without additional application of additional energy or other curative trigger (e.g., force).

In some embodiments, the dental appliance can be molded of a thermoset polymer material, as discussed herein. As will be appreciated, the dental appliance can be placed within a molding tool and the thermoset polymer precursor can be supplied to the molding tool to form the dental appliance. Supplying the thermoset polymer precursor can, for example, include injecting a fluid thermoset polymer precursor, and an optional catalyst, into the mold under low pressure to fill the mold cavity volume.

Since the thermoset polymer precursor can have a low viscosity, the thermoset polymer precursor can substantially fill spaces defined by various surfaces of the dental appliance. A curative trigger (e.g., pressure, one or more chemicals, light and/or heat that causes the thermoset polymer to finally cure) can then be applied to cure the thermoset polymer precursor to form the dental appliance.

In some embodiments, a method for molding a dental appliance includes placing a mold having an internal cavity, where the internal cavity includes a first portion and a second portion, at a first position so that the second portion is in a higher relative position than the first portion. Also, a thermoset polymer precursor can be injected through the mold into the first portion of the internal cavity to partially fill the internal cavity.

Once the thermoset polymer precursor has been injected, the mold can be moved from a first position to a second position to reorient the first portion and the second portion so the first portion is in a higher relative position than the second portion. The thermoset polymer precursor can then be injected through the mold into the second portion of the internal cavity to at least partially fill the internal cavity.

After partial or substantially complete curing, the dental appliance can be removed from the mold. A post cure process can also be used.

As will be appreciated, a variety of molding processes exist that can be used to form the dental appliances. Examples of such molding processes can include thermoset polymer precursor transfer molding, compression molding, and injection molding, among others.

In various embodiments, the dental appliance could be formed in a casting process or stamping process. In one or more embodiments, portions (e.g., layers, sections) of a dental appliance can be individually formed (e.g., cast, molded) and subsequently coupled together to form the dental appliance. Examples of suitable techniques for coupling the individual portions include use of natural or synthetic adhesives and/or thermal energy to join the individual portions together.

As provided herein, thermoset polymer materials can be formed from the cross-linking (e.g., polymerization) of one or more thermoset polymer precursor(s). In the embodiments described herein, the thermoset polymer precursor can be selected from an unsaturated polyester, a polyurethane, an epoxy, an epoxy vinyl ester, a phenolic, a silicone, an alkyd, an allylic, a vinyl ester, a furan, a polyimide, a cyanate ester, a bismaleimide, a polybutadiene, and a polyetheramide, among other suitable thermoset polymer materials. In one embodiment, the thermoset polymer precursor includes resin in an A-stage of cure (i.e., unreacted resin).

As will be appreciated, the thermoset polymer material used in the embodiments of the present disclosure can also include reinforcement materials and/or additives such as one or more fillers, wires, fibers, curing agents, inhibitors, catalysts, and toughening agents (e.g., elastomers), among others, to achieve a desirable combination of physical, mechanical, chemical, and/or thermal properties. Reinforcement materials can include woven and/or nonwoven fibrous materials, particulate materials, and/or other high strength materials. Examples of reinforcement materials can include, but are not limited to, synthetic fibers, natural fibers, and ceramic fibers. Fillers include materials added to the matrix of the thermoset polymer material to alter its physical, mechanical, thermal, or chemical properties. Such fillers can include, but are not limited to, organic and inorganic materials, clays, silicates, mica, talcs, rubbers, fines, and paper, among others.

In one or more embodiments, the classes of thermoset polymer materials are biocompatible (e.g., thermoset polyurethanes, silicone rubbers, and acrylics such as methyl methacrylate (MMA) and polyethene glycol dimethacrylate (PEGDMA) copolymer). Embodiments can use a material that is mechanically and/or chemically stable in a saliva environment. In some embodiments, it is beneficial for the thermoset polymer material to be chemically resistant to teeth cleaning materials.

As will be appreciated, the thermoset polymer precursor can be formed into the thermoset polymer material by a polymerization reaction initiated and cured through heat, pressure, chemical reaction with catalysts, ultraviolet light, irradiation (e.g., electron beam processing), and/or other types of energy. The curing process transforms the thermoset polymer precursor into the thermoset polymer by a cross-linking process.

Energy or catalysts may be added that cause the molecules to react at chemically active sites, linking the molecules into a rigid three-dimensional structure. The cross-linking process forms a molecule with a relatively larger molecular weight, resulting in a material having a higher melting point. The polymerization reaction increases the molecular weight such that the material solidifies, and will burn rather than melt at elevated temperatures.

In one or more embodiments, the thermoset polymer material of the present disclosure can have at least one percent (1%) cross-linking network structure. This improves the structural characteristics of the material for a dental appliance application in some instances, as discussed further below.

The thermoset polymer material can have clarity characteristics ranging from opaque to clear (e.g., transparent). The thermoset polymer material can be non-colored or colored (e.g., include colored agents), which thereby may provide shading ranging from a colored opaque to a tinted transparent, or further to a clear transparent.

As previously discussed, polymeric dental positioning appliances can be used for aligning teeth. Such appliances may, for example, utilize a thin shell of material having resilient properties that generally conforms to a patient's teeth but is slightly out of alignment with the patient's teeth. Placement of such an appliance over the teeth provides controlled forces in specific locations to gradually move the teeth into a new configuration.

Therefore, the material used to fabricate the polymeric dental positioning appliances (e.g., an aligner) needs to have a tensile strength such that when the material is deformed over an initial tooth configuration, sufficient force may be transferred to the tooth, or teeth, causing the deformation. Since deformation of the polymeric dental positioning appliance is used to create the forces applied to a tooth, or teeth, the material should be capable of elongation without breakage, have sufficiently large tensile and flexural moduli, and/or have stress relaxation characteristics that allow for the generation of force by resilient opposition to deformation.

In one or more embodiments, the thermoset polymer material can have one or more of the following characteristics: a tensile strength at yield of greater than 6,000 pounds per square inch (psi), an elongation at yield of greater than ten percent (10%), an elongation at break of greater than eighty percent (80%), a tensile modulus at secant one percent (1%) greater than 100,000 psi, a flexural modulus greater than 100,000 psi, and stress relaxation in 37° C. and one hundred percent (100%) relative humidity over 24 hours of more than twenty percent (20%).

Dental appliances fabricated using thermoset polymer material, such as those having one or more of the above-mentioned characteristics, can be more resilient than that of thermoplastic polymers. Due to the cross-linked structure, thermoset polymer materials can retain their original shape better and/or longer than thermoplastic polymers, and thereby maintain application of a relatively more consistent force when used to achieve orthodontic tooth movement. As will be appreciated, fabricating dental appliances using thermoset polymer materials that retain their original shape better and/or longer can improve dental appliance performance, such as over a given treatment time of a particular dental appliance (e.g., 2-3 weeks for some aligner embodiments), since material fatigue is reduced.

Less material fatigue results, for example, in a more constant force being delivered by a dental appliance formed with a thermoset polymer material. Using a dental appliance fabricated of thermoset polymer material for orthodontic treatment can also result in more predictable outcomes (e.g., teeth movement) with respect to original programmed movements in some instances. Increasing predictability through better controlled force application can reduce treating professional intervention to correct a teeth configuration that does not match expected results.

Improved performance can also support longer treatment periods and/or greater tooth movement distance, and thus, fewer intermediate aligners between an initial and final teeth position, may be utilized in some instances. In turn, fabrication costs may be reduced for some treatment plans, since fewer dental appliances may be needed.

Figure 3:
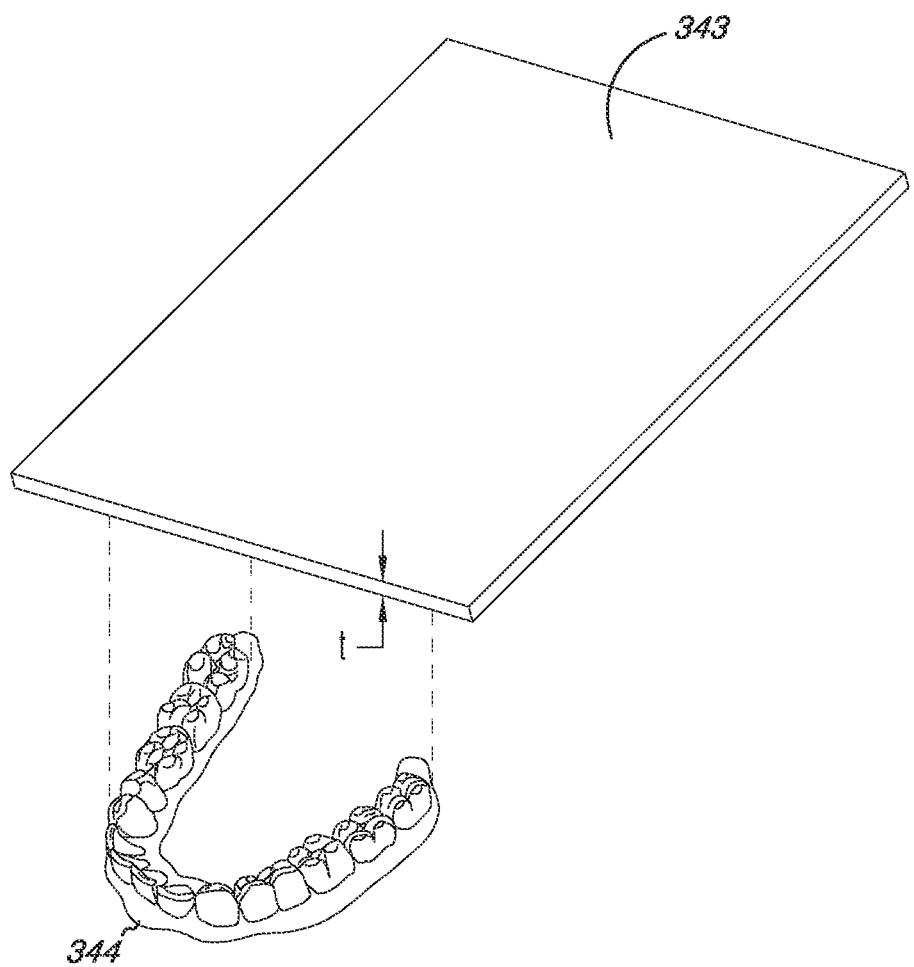
FIG. 3 illustrates an embodiment of a first shape with respect to a dentition according to the present disclosure.

FIG. 3 illustrates an embodiment of a first shape 343 with respect to a dentition 344 according to the present disclosure. According to one or more embodiments, the first shape 343 can be formed to be substantially flat, such as into a semi-solid sheet of partially cured thermoset polymer material, for example.

The first shape 343 can be formed to have a substantially constant thickness, or non-uniform thickness, (e.g., t as shown in FIG. 3). The thickness of the first shape may, for example, be based on jaw size or crown height, crown height being the dimension of a tooth measured from the junction between the enamel of the crown and the dentine of the roots, to the occlusal surface, as will be understood by one having ordinary skill in the art. For instance, a thicker first shape may provide more material, e.g., greater volume, to thermoform over a larger jaw size, e.g., larger dentition molds. For example, relatively larger dental appliances can also be provided with a thicker first shape 343, since the first shape 343 may be stretched more in forming a larger sized dental appliance relative to a smaller size dental appliance.

Non-uniform thickness can, for example, be utilized to provide a more uniform final thickness to a dental appliance, as in some instances, the thickness of the material may change as the appliance is formed. Accordingly, sections that typically get thinner during formation of the dental appliance, can be provided with an extra thickness during formation of the first shape 343. In some embodiments, extra thickness can be used to reinforce some areas of the appliance. For example, in some areas, the extra thickness can be used to provide extra force and/or rigidity to a particular area of the appliance.

Non-uniform thickness can, for example, vary in the range of 10-30 mil.; however, embodiments of the present disclosure are not limited to this range, and thickness may vary more, or less, than the above-mentioned range. According to one or more embodiments, a green phase first sheet is fabricated to include a non-uniform thickness across the first sheet in the range of 20-30 mil., the thickness at any particular point on the first sheet such that after forming the dental appliance has a uniform thickness of 20 mil.

To achieve uniform thickness after forming and curing, areas of the first sheet that will be subject to stretching and/or thinning by bending during forming of the dental appliance over a mold may be fabricated to have a greater thickness than areas of the first sheet that will not be subject to such localized forming forces. The reader will appreciate, that areas of the first sheet corresponding to transitions during forming into a final dental appliance, can be formed to have a greater thickness in the first sheet to accommodate the change in thickness during the forming transition.

The first sheet can be fabricated to have non-uniform thickness, such that a dental appliance formed from the first sheet having the non-uniform thickness, will also have non-uniform thickness. For example, it may be desired to have an occlusal area of a dental appliance (after forming) to have a different thickness than a gingival area of the dental appliance. It may also be desired, depending on the forces needed to move particular teeth, to have one area of the dental appliance have a different thickness than another area of the dental appliance. These areas of different thickness in the final dental appliance may be achieved, at least in part, by forming the dental appliance using a green phase first sheet fabricated to have a non-uniform thickness across the first sheet (e.g., the first sheet being thicker in areas corresponding to areas of the dental appliance desired to have greater thickness).

Figure 9:
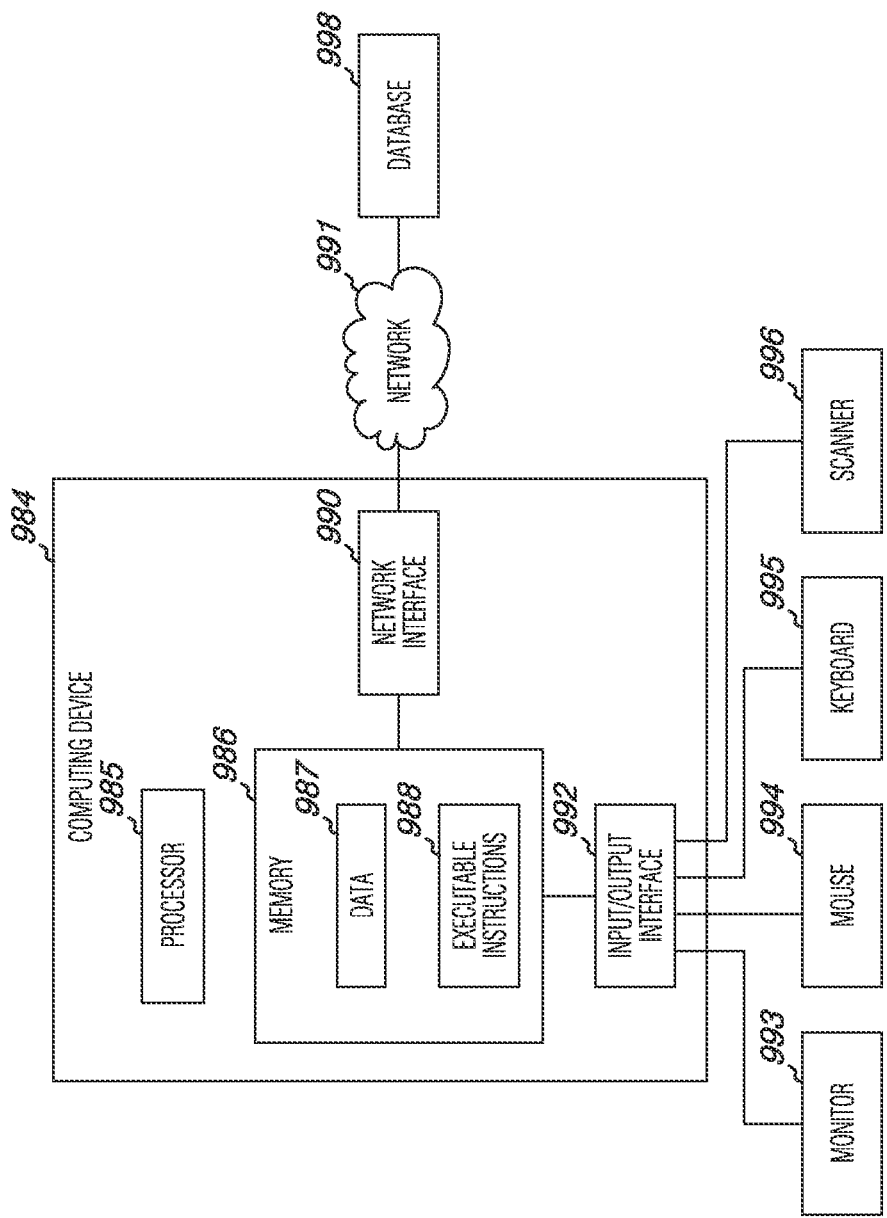
FIG. 9 illustrates a computing device embodiment to perform a method for evaluating a dental condition according to an embodiment of the present disclosure.

Computer analysis may be used to model such material forces during formation from the first sheet (e.g., green phase) to the final dental appliance, for example, by using a computer system such as that illustrated in FIG. 9. Computer modeling and analysis may also be used to predict forces used to achieve desired tooth movement over a course of treatment, and how dental appliance material thickness impacts those forces, such as uniform thickness across the dental appliance and/or localized variations in material thickness. A computer system may be used to simulate force, accounting for material thickness, and in doing so determine customized thickness characteristics for a particular first sheet.

Figure 4A:
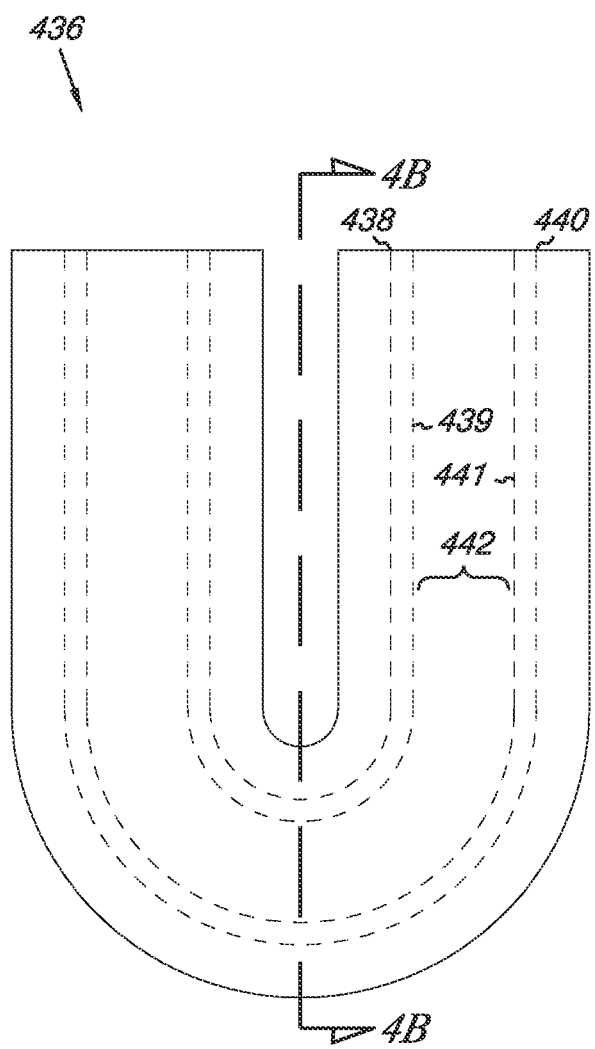
FIG. 4A illustrates an embodiment of a first shape substantially horseshoe-shaped in at least one dimension according to the present disclosure.

FIG. 4A illustrates an embodiment of a first shape 436 substantially horseshoe-shaped in at least one dimension according to the present disclosure. As a patient's dentition, and the polymeric dental appliances for orthodontic dental treatment, are general horseshoe-shaped in at least one dimension, by forming the first shape, e.g., 436, to be substantially horseshoe-shaped in at least one dimension can save some material, compared with a square-shaped, e.g., sheet-like, first shape.

Figure 4B:
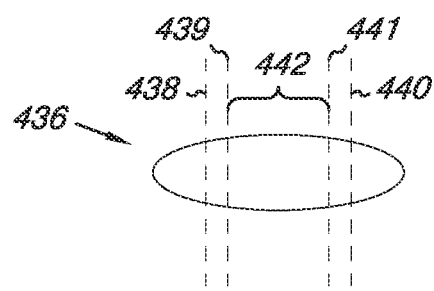
FIG. 4B illustrates a first shape cross section as taken along line 4B-4B of FIG. 4A.

FIG. 4B illustrates a first shape 436 cross section as taken along line 4B-4B of FIG. 4A. The cross section of first shape 436 illustrates that the first shape can be formed to have a non-uniform thickness. However in some embodiments, a first shape that is substantially horseshoe-shaped in at least one dimension can also be formed to be substantially flat, e.g., having a constant thickness.

As one might envision first shape 436 being subsequently thermoformed onto a dentition, the reader can appreciate the location of side portions used to form the sides of a dental appliance generally at lines 438 and 440 on the first shape. The portion of the first shape 436 that will be formed into an occlusal surface of the dental appliance is located generally between lines 439 and 441. The approximate location on the first shape 436 which corresponds then to the transition from the occlusal surface to the side surfaces after thermoforming onto a dentition is generally between lines 438 and 439, and between lines 440 and 441 respectively.

The area between lines 438 and 440 on the first shape corresponds to the location at which the occlusal surface area 442 will exist after thermoforming onto a dentition, as shown in FIGS. 4A and 4B. The thickness of the first sheet 436 need not be uniform in cross section at lines 438 and 440 with respect to the occlusal surface area 442. The thickness of a first shape can vary across its cross section.

The material in some areas of the first shape may be stretched further in forming a dental appliance; therefore, in some instances it can be beneficial to have a greater quantity of thermoset polymer material with which to use in stretching in particular areas of the first shape. For a fixed area of the first shape, and given a constant density of thermoset polymer material, a greater quantity of thermoset polymer material corresponds to a greater thickness in the fixed area.

One skilled in the art will appreciate then, that a thicker first shape provides a greater quantity of thermoset polymer material than a thinner first shape having the same planar area. It will be further appreciated that for a larger jaw size, in order to obtain a dental appliance with the same post-shaping thicknesses, a greater quantity of thermoset polymer material is needed, which can be obtained by using a thicker first shape for a given planar area.

The thickness of the first shape can also vary such that the thermoset polymer material has a greater thickness along the transition lines 438 and 440 and/or along the side surfaces than along an occlusal surface after thermoforming onto the dentition mold. The thickness of the first shape can also vary, in one or more dimensions, such that the thermoset polymer material has a substantially constant thickness after thermoforming onto the dentition mold.

In some embodiments, first shapes may be made in mass quantities, and stored, or may be made on demand according to a particular patient's needs. The first shape may be customized to the shape of a patient's jaw, and with variable thickness to accommodate different crown heights.

Figures 5A, 5B:
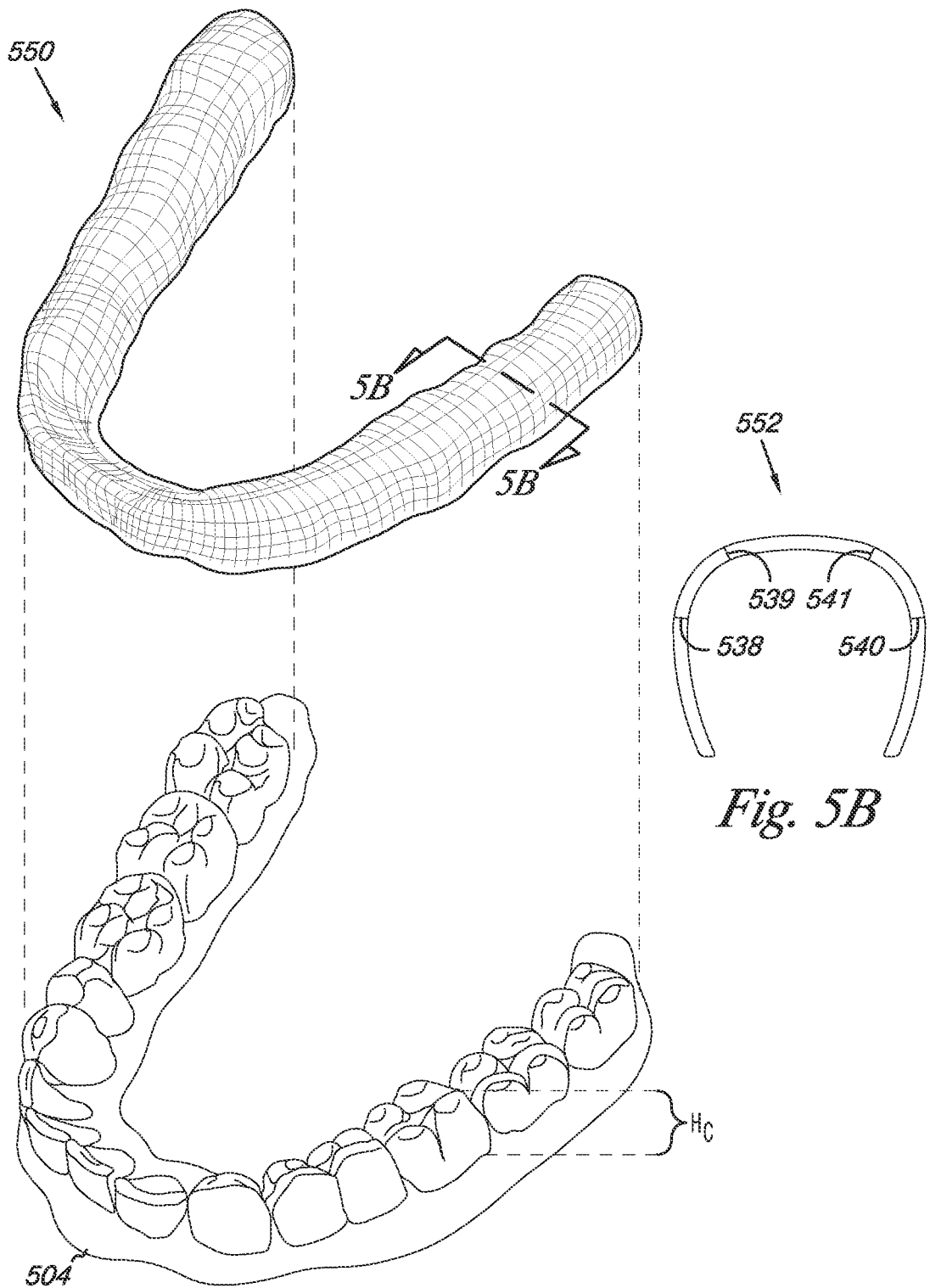
FIG. 5A illustrates an embodiment of a first shape substantially horseshoe-shaped in at least two dimensions according to the present disclosure.
FIG. 5B illustrates a first shape cross section as taken along line 5B-5B of FIG. 5A.

FIG. 5A illustrates an embodiment of a first shape 550 substantially horseshoe-shaped in at least two dimensions according to the present disclosure, and FIG. 5B illustrates the first shape cross section 552 as taken along line 5B-5B of FIG. 5A. FIG. 5A shows a first shape 550 used to form a dental appliance that will correspond to a negative dentition mold of the intended configuration 504.

From FIGS. 5A and 5B, it can be seen that the first shape 550 is formed to be substantially horseshoe-shaped in a first dimension, similar to first shape 436 shown in FIG. 4A. First shape 550 also has a substantially horseshoe-shaped cross section, e.g., be substantially horseshoe-shaped in a second dimension, as can be appreciated from FIG. 5B. Thus, first shape 550 has a substantially horseshoe-shaped cross section 552 along its substantially horseshoe-shape in a first dimension. Lines 538, 539, 540 and 541 shown in FIG. 5B on cross-section 552 correspond in location respectively to lines 438, 439, 440 and 441 shown on first shape 436 in FIGS. 4A and 4B.

Figure 6:
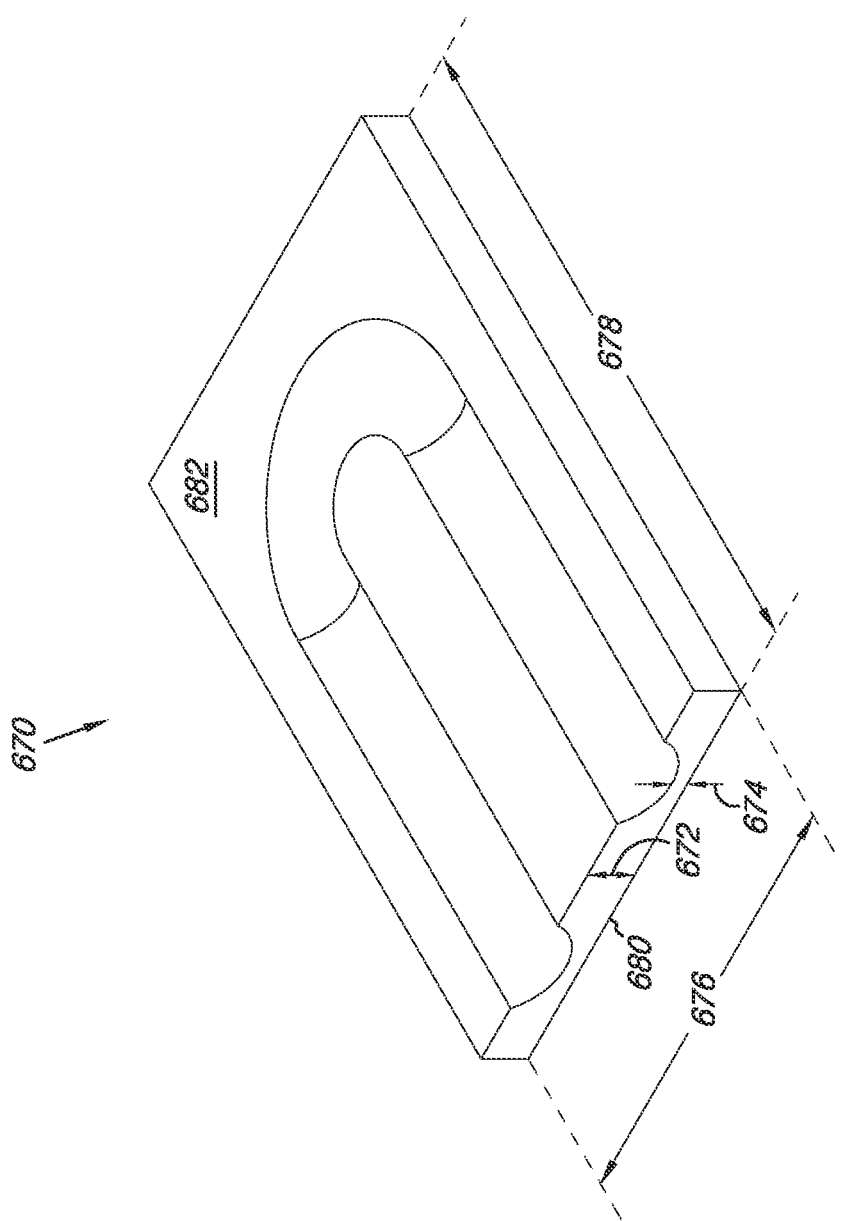
FIG. 6 illustrates an embodiment of a first shape having a variable thickness according to the present disclosure.

FIG. 6 illustrates an embodiment of a first shape 670 having a variable thickness according to the present disclosure. It can be beneficial in some instances to apply force to move teeth at a particular location close to the root. Therefore in such instances, it can be beneficial for a polymeric dental appliance for orthodontic dental treatment to be thicker along a gingival line, in order to provide more material stiffness, and thus more force. It can also be beneficial in some embodiments for a polymeric dental appliance for orthodontic dental treatment to be thinner at the occlusal surface, for example, to minimize the gap created in bite between the jaws when the dental appliance is in place.

The thickness, e.g., 672, of a first shape 670 can vary independently along one or more dimensions, e.g., width 676 and/or length 678. First shape can have one or more flat surfaces, e.g., on a bottom surface 680 and or a top surface 682. Furthermore, the first shape may be formed to have a thickness that varies such that the thermoset polymer material has a greater thickness 672 at locations corresponding to where the gingival lines will be formed, than the thickness 674 corresponding to where an occlusal surface will be formed.

For example, first shape 670 may be formed to have a channel, or groove, within a top surface 682 (as shown) and/or a bottom surface. The channel can, for example, substantially follow a horse-shoe shape of the dentition onto which it may be thermoformed, and may be any suitable cross-section (e.g., semi-circular as shown in FIG. 9).

Figure 7:
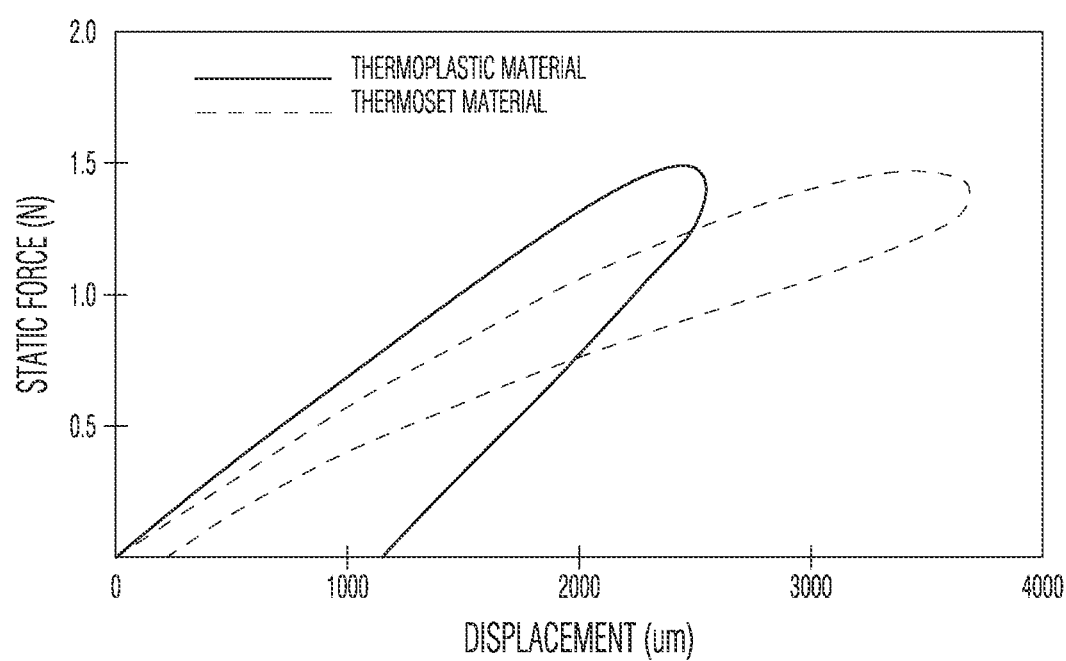
FIG. 7 illustrates working range curves of displacement as a function of static force for a thermoset polymer material in contrast to a thermoplastic material that may be used to form dental appliances of embodiments according to the present disclosure.

FIG. 7 illustrates working range curves of displacement as a function of static force for thermoset polymer material in contrast to thermoplastic material. As will be appreciated, the displacement of thermoset polymer material is generally within a narrower range for a given magnitude of static force, than are expected for thermoplastic material.

That is, that the range of deformation for thermoset polymer material is generally less at a particular applied force, than the range of deformation for thermoplastic material at the same particular applied force, as can be seen by the narrower horizontal width bounded by each curve at the particular applied force. A smaller deformation range can help provide more precise, and thus controllable, locating of teeth positioning.

Figure 8:
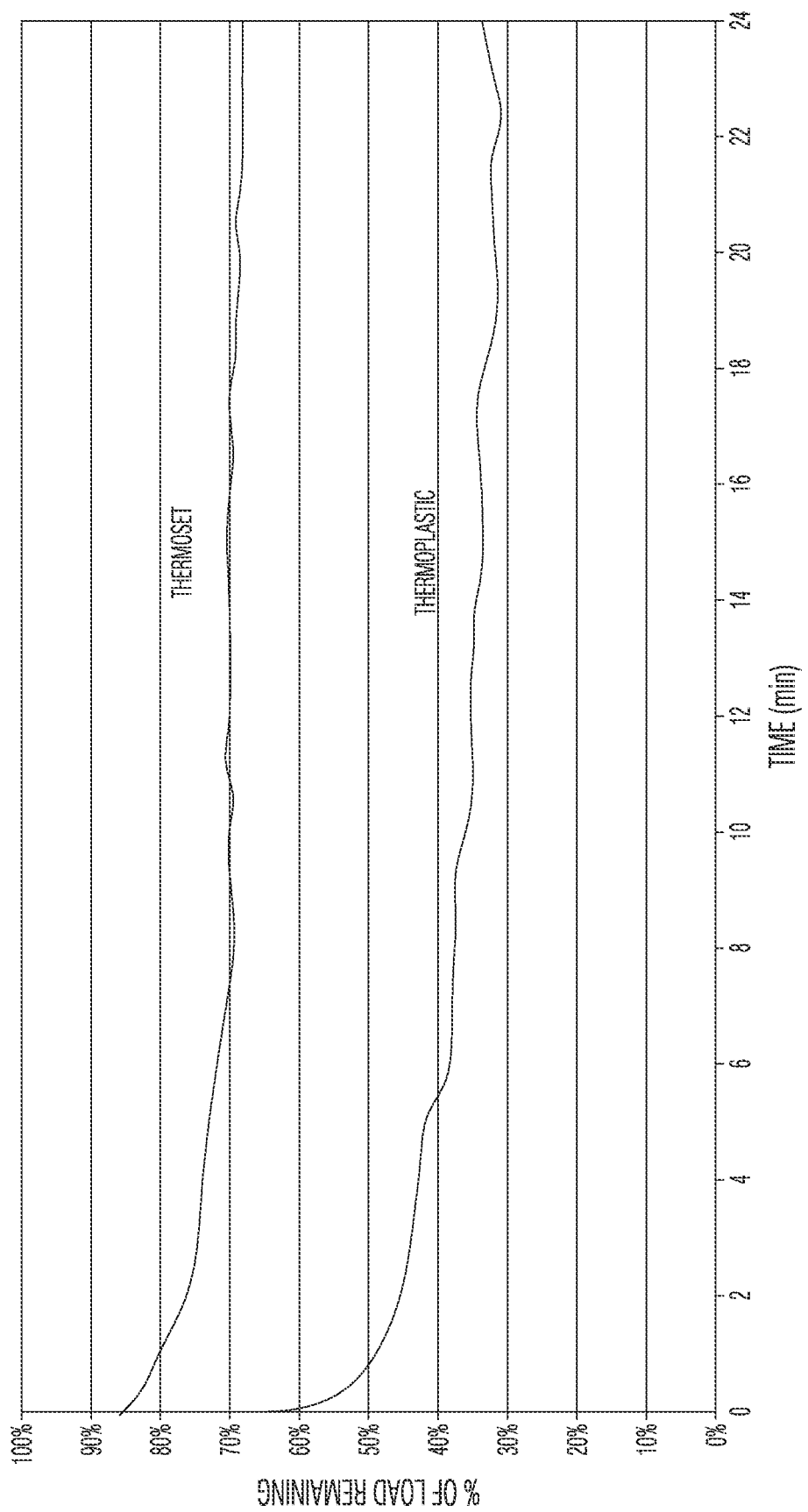
FIG. 8 illustrates stress relaxation performance curves of percentage of load remaining as a function of time for a thermoset polymer material in contrast to a thermoplastic material that may be used to form dental appliances of embodiments according to the present disclosure.

FIG. 8 illustrates stress relaxation performance curves of percentage of load remaining as a function of time for thermoset polymer material (e.g., casting polyurethane) in contrast to thermoplastic material (e.g., polyester, thermoplastic polyurethane). FIG. 8 illustrates thermoset polymer material and thermoplastic material response to relaxation of stress when tested at five percent (5%) strain, a temperature of 37° C., and one hundred percent (100%) relative humidity. As may be observed, the thermoset polymer material exhibits a greater percentage of load remaining over time, indicating less susceptibility to fatigue of the thermoset polymer material as compared to the thermoplastic material.

FIG. 9 illustrates a computing device embodiment to perform a method for evaluating a dental condition according to an embodiment of the present disclosure. The computing device 984 illustrated in FIG. 9, includes a processor 985 and memory 986. Memory 986 can include various types of information including data 987 and computing device executable instructions 988 as discussed herein.

Memory can be used for a variety of different functions in the various embodiments. For example, memory can be used to store executable instructions that can be used to interact with the other components of the computing device and/or network including other computing devices and can be used to store information, such as instructions for manipulating one or more files.

For instance, in some embodiments, a computing device can include executable instructions for saving a number of program and/or data files, such as files, for providing executable instructions that allow for the viewing functionality for viewing scans and/or models, and the data files for the scans and/or digital models. Some executable instructions can, for example, be instructions for saving local scans and/or digital models, scans and/or digital models from another computing device on the network, or a combination of two or more of these.

Additionally, as illustrated in the embodiment of FIG. 9, a system can include a network interface 990. Such an interface can allow for processing on one or more networked computing devices or such devices can be used to transmit and/or receive scans and/or digital models and/or executable instructions for use with various embodiments provided herein.

The network interface 990 can connect the computing device to a network 991. The network 991 can be connected to other computing devices that can execute to make scans and/or digital models of a patient's teeth.

For example, the digital model obtained from a scanner that is interfaced with computing device 984 can be sent on the network 991 to other computing devices. In some embodiments, a number of treatment professionals can have access to the computing devices on the network 991 so they can view and diagnose the dental condition of a user based on the digital model from a remote location.

In the embodiment of FIG. 9, the network 991 is connected to a database 998. The database 998 can, for example, include a case history database that can give access to prior patient's data or other data resources to use in the evaluation and/or treatment process. In such embodiments, treatment professionals that have access to the network 991 and in turn the database 998 can use the database to supplement their evaluation and/or treatment of a user's dental condition.

In some embodiments, the computing device 984 can include executable instructions for estimating the thickness of various portions of the partially cured material. For example, executable instructions can be provided to adjust the thickness of the partially cured material in order to compensate for bending or stretching that may occur during formation of the dental appliance. The data regarding the bending and/or stretching for such analysis can be provided, for example, in memory 986 and/or database 998.

As illustrated in the embodiment of FIG. 9, a system can include one or more input and/or output interfaces 992. Such interfaces can be used to connect the computing device with one or more input and/or output devices.

Such connectivity on the network 991 can allow for the input and/or output of manipulations (e.g., changes to the common file embedded in executable instructions) among other types of information. Although some embodiments may be distributed among various computing devices within one or more networks, such systems as illustrated in FIG. 9, can be beneficial in allowing for the capture, calculation, and/or analysis of the various information discussed herein. For example, the information regarding the adjustment of the thickness of the partially cured material can be provided to a device that is forming the partially cured material, such as via the output interface 992.

Various embodiments include the use of executable instructions to accomplish one or more processes. Such instructions can, for example, be implemented on one or more computing devices and therefore in such embodiments, the executable instructions should be viewed as being computing device executable instructions for implementation by one or more computing devices.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the use of the terms "a", "an", "one or more", "a number of", or "at least one" are all to be interpreted as meaning one or more of an item is present. Additionally, it is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method of forming a dental appliance, comprising:
   partially curing a prepolymer mixture in a first mold to form a partially cured polymer mixture, wherein the first mold has an internal cavity that is shaped to provide the partially cured polymer mixture with a first shape having a channel in accordance with a dental arch, wherein the first shape has a greater thickness at locations corresponding to where a gingival line of the dental appliance will be formed compared to a thickness at occlusal surfaces of the dental appliance;
   modifying the first shape of the partially cured polymer mixture to form a shell having cavities shaped to receive teeth; and
   fully curing the shell by exposing the partially cured polymer mixture to energy until the partially cured polymer mixture thermosets.

2. The method of claim 1, wherein the first shape includes a horseshoe shape in at least one dimension.

3. The method of claim 1, wherein the prepolymer mixture comprises two or more prepolymer components.

4. The method of claim 3, further comprising forming the prepolymer mixture by mixing the two or more prepolymer components with one or more curatives to initiate a chemical reaction of the two or more prepolymer components.

5. The method of claim 1, wherein fully curing the shell includes causing a molecular cross-linking reaction.

6. The method of claim 1, wherein the fully cured shell is configured to apply forces to teeth of a patient in accordance with an orthodontic treatment plan.

7. The method of claim 1, wherein modifying the first shape comprises using a second mold to shape an internal surface of the cavities.

8. The method of claim 7, wherein the second mold is a positive dentition mold having an external surface corresponding to the internal surface of the cavities.

9. The method of claim 7, wherein a volume of the partially cured polymer mixture is positioned between the first and second molds.

10. A method of forming a dental appliance, comprising:
    partially curing a prepolymer material in a first mold to form a partially cured polymer material, wherein the first mold has an internal cavity that is shaped to provide the partially cured polymer material with a first shape having a channel in accordance with a dental arch, wherein the first shape has a greater thickness at locations corresponding to where a gingival line of the dental appliance will be formed compared to a thickness at occlusal surfaces of the dental appliance;
    changing the first shape of the partially cured polymer material using a second mold so that the partially cured polymer material takes on a second shape having cavities shaped to receive teeth; and
    forming the dental appliance by fully curing the partially cured polymer material, where the fully curing comprises exposing the partially cured polymer material to energy until the partially cured polymer material thermosets.

11. The method of claim 10, wherein the dental appliance is configured to apply forces to teeth of a patient in accordance with an orthodontic treatment plan.

12. The method of claim 10, wherein one or more of the cavities of the dental appliance is oversized to accommodate a chemical for treating one or more of a patient's teeth.

13. The method of claim 10, further comprising forming the prepolymer material by mixing two or more prepolymer components with one or more curatives to initiate a chemical reaction of the two or more prepolymer components.

14. The method of claim 10, wherein fully curing the partially cured polymer material includes causing a molecular cross-linking reaction.

15. The method of claim 10, further comprising delivering a fluid comprising a prepolymer mixture into the first mold, wherein the prepolymer mixture partially cures to form the partially cured polymer material.

16. The method of claim 10, wherein the second mold is a positive dentition mold having an external surface corresponding to an internal surface of the cavities.

17. The method of claim 10, wherein a volume of the partially cured prepolymer material is positioned between the first and second molds.

18. A method of forming a shell aligner, comprising:
    partially curing a prepolymer mixture in a first mold to form a partially cured polymer mixture, wherein the first mold has an internal cavity that is shaped to provide the partially cured polymer mixture with a first shape that includes a channel in accordance with a dental arch, wherein the first shape has a greater thickness at locations corresponding to where a gingival line of the shell aligner will be formed compared to a thickness at occlusal surfaces of the shell aligner;
    changing a shape of the partially cured polymer mixture to a final shape of the shell aligner having cavities shaped to receive teeth; and
    thermosetting the shell aligner by exposing the partially cured polymer mixture to energy to increase a rigidity of the shell aligner.

19. The method of claim 18, wherein thermosetting the shell aligner includes causing a molecular cross-linking reaction.

20. The method of claim 18, wherein the shell aligner is configured to apply forces to teeth of a patient in accordance with an orthodontic treatment plan.

21. The method of claim 18, wherein changing the shape of the partially cured polymer mixture comprises using a second mold to shape an internal surface of the cavities.

* * * * *